United States Patent Office 3,412,659
Patented Nov. 26, 1968

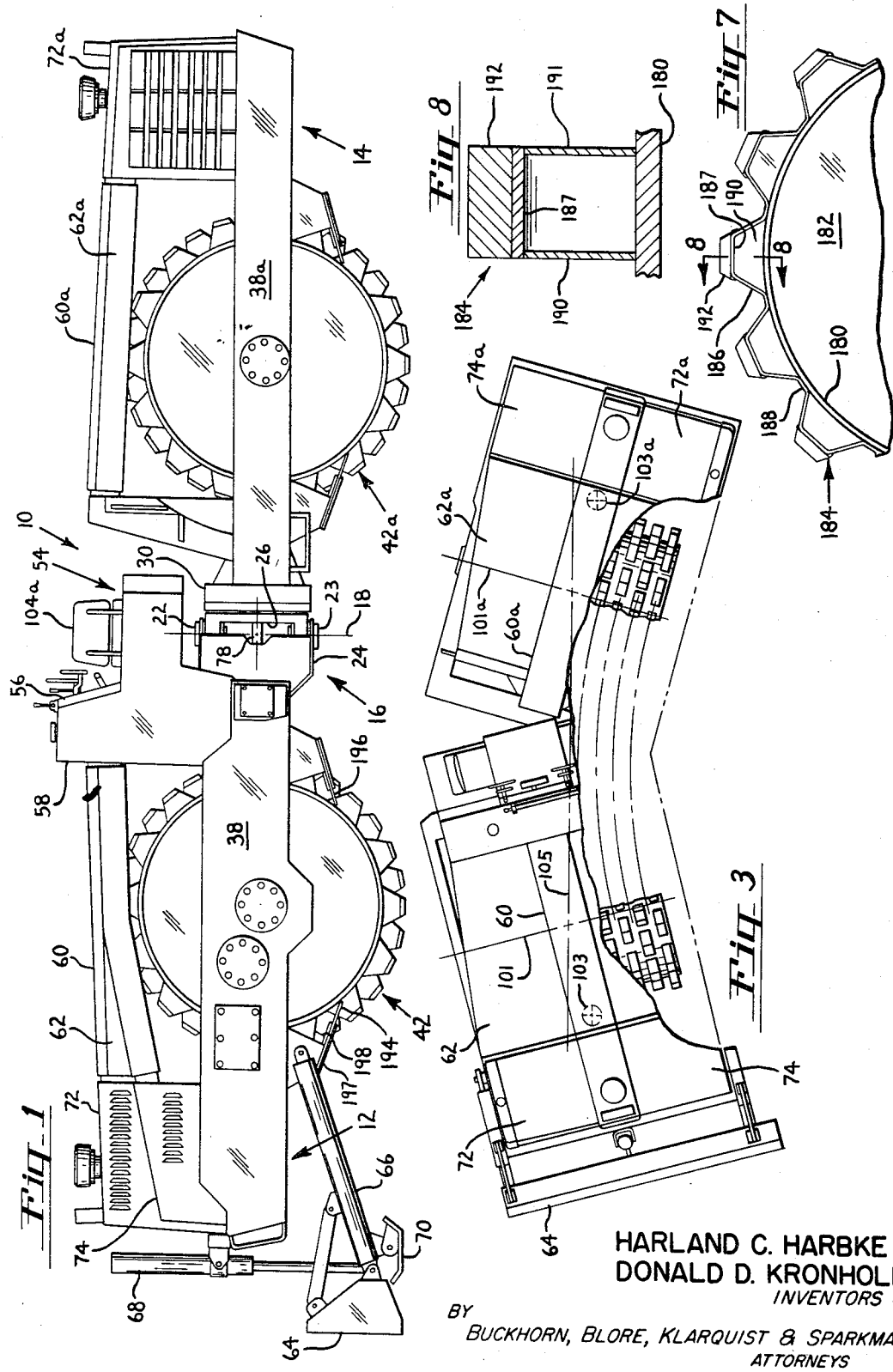

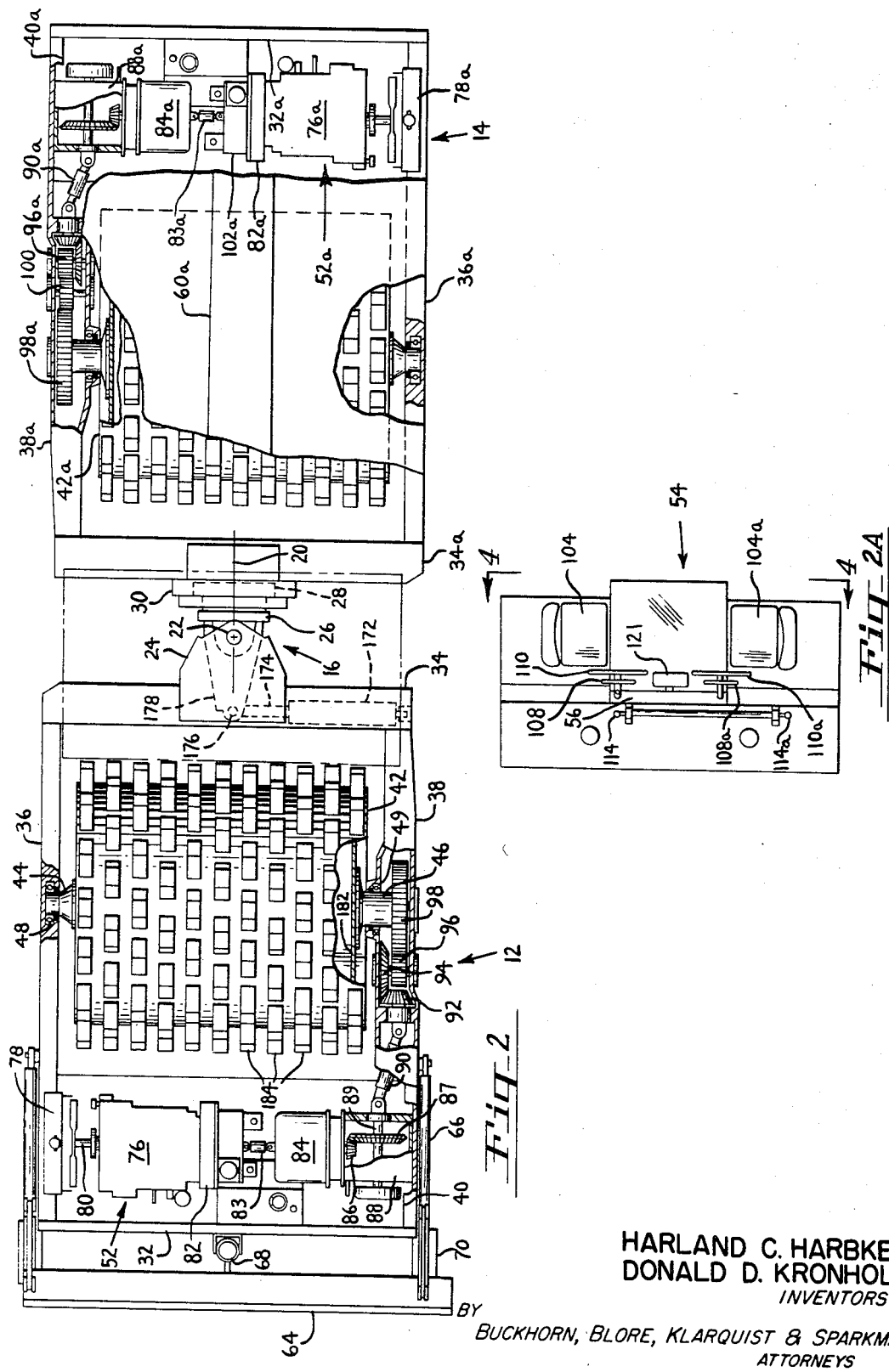

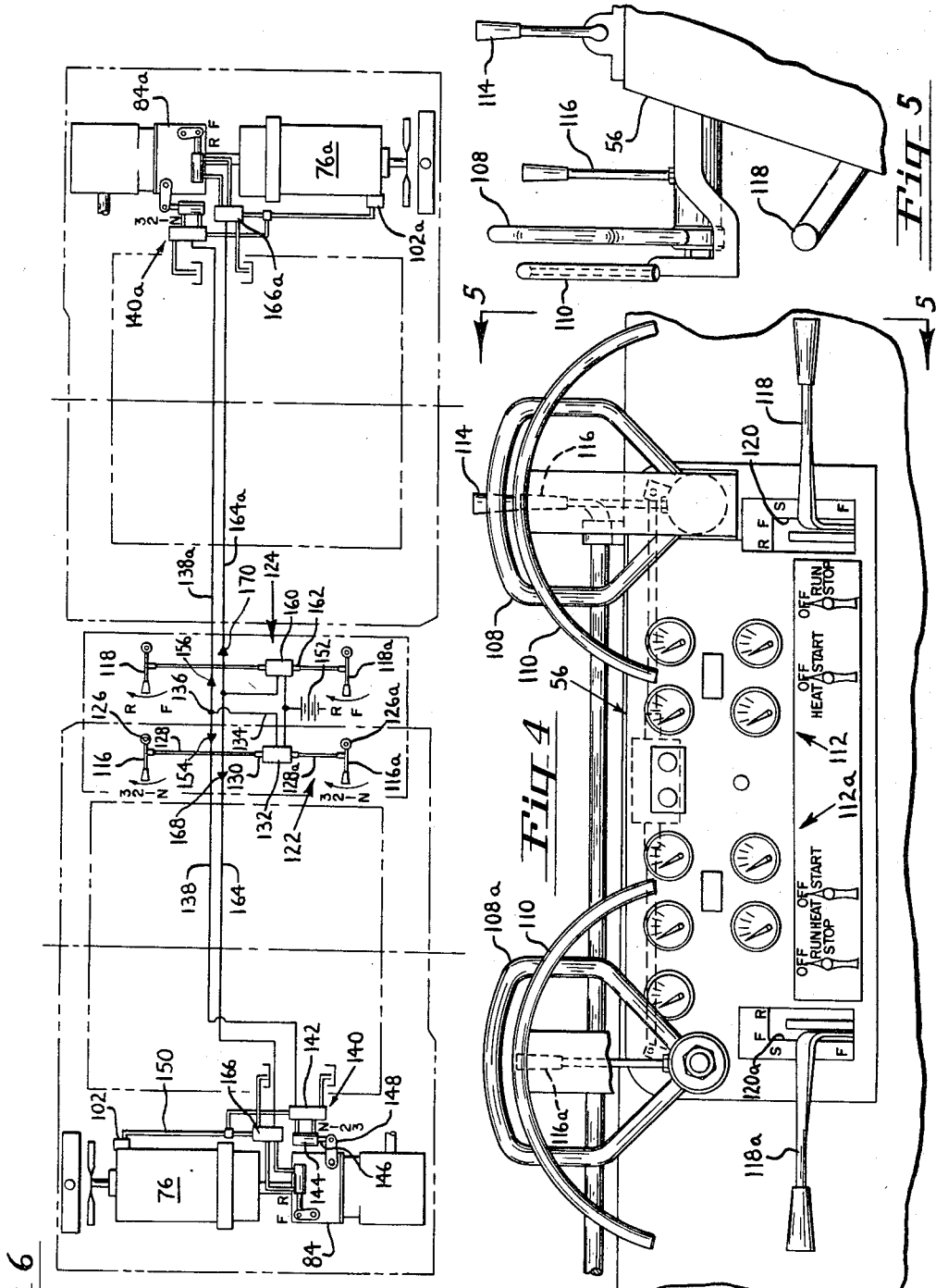

3,412,659
SELF-PROPELLED COMPACTOR VEHICLE
Harland C. Harbke and Donald D. Kronholm, Portland, Oreg., assignors to Hyster Company, Portland, Oreg., a corporation of Nevada
Filed July 18, 1966, Ser. No. 565,918
29 Claims. (Cl. 94—50)

ABSTRACT OF THE DISCLOSURE

An earth compactor including tandem rollers supporting separate frames, with each roller being independently powered by its own internal combustion engine, fluid transmission and drive train carried by its associated frame. The compactor is steered hydraulically at an articulated connection between frames. Dual remote steering and driving controls in a driver's compartment above the connection between frames are operated from one of two driver's seats facing inwardly at opposite sides of the compartment.

---

The present invention relates to earth compactor vehicles, and more particularly to a self-propelled compactor vehicle especially suitable for use as an embankment compactor but also suitable for general compaction purposes.

High compactive effect and high production are the primary requisites of an embankment compactor, and to fulfill these requisites the compactor must combine unusually heavy weight with high speed. Because of the great traction necessary to move a heavy-weight compactor at high speed, embankment compactors are usually self-propelled. High-production compaction is also a function of many factors other than weight, speed and traction, such as the width of continuous compaction coverage obtained in a single pass of the compactor, the effective number of coverages in a single pass, maneuverability, weight distribution and operator visibility, comfort and control. Prior self-propelled compactors have been deficient in at least one of the above respects or in others affecting the compaction or production capabilities of the machine.

It is therefore a primary object of the present invention to provide a self-propelled embankment compactor having greater compaction and production capabilities than prior such compactors.

Other important objects of the present invention are as follows:

To provide a heavy-weight, yet high-speed compactor;

To provide a compactor vehicle having maximum traction enabling full power utilization;

To provide a compactor giving continuous compaction coverage throughout substantially the full width of the vehicle in a single pass;

To provide a compactor having substantially equal maneuverability in both forward and reverse directions to eliminate turn-arounds after each pass and provide maximum maneuverability on short fills and in close quarters;

To provide a compactor vehicle giving two compaction coverages in a single pass, even in turns;

To provide a compactor vehicle with substantially balanced unit loading on all compaction wheels for maximum traction and most efficient compaction;

To provide a heavy-weight compactor vehicle that is stable in turns at high speeds;

To provide a compactor vehicle wherein all of the compaction wheels remain in contact with the ground at all times, even in rough fills, for uniform compaction;

To provide, in a compactor, optimum driver visibility, comfort and control while the vehicle is traveling in either a forward or reverse direction;

To provide a compactor vehicle of a simplified construction which is economical to manufacture;

To provide an improved roller for a compactor, including an improved and simplified tamping foot construction;

To provide an improved cleaning means for removing dirt from between adjacent tamping feet while the compactor is in operation; and To provide an improved remote control means for controlling the operation of the compactor's driver means.

SUMMARY OF THE INVENTION

The foregoing objects are furthered by providing a compactor with tandem rollers supporting separate frames and driven independently by separate internal combustion engines, transmissions and drive trains.

High speed and maximum tractive and compactive effort and therefore high production are promoted by providing rollers of equal size and by arranging the rollers and engines symmetrically with respect to a central turning axis of the frames to distribute weight equally to each roll. Arrangement of a driver compartment midway between rollers and the provision of dual steering and driving controls and dual inwardly directed seating at opposite sides of the vehicle provides equal driver visibilty and control in either forward or reverse and from either side of the compactor. Center point steering, coupled with the arrangement of the engines outwardly of the rollers, provides good stability in turns at high speeds. The rollers extend the full width of the frame, and center point steering provides perfect tracking to result in two complete coverages per pass. The substantial identity of the two frames, their components, and the arrangement of the components on the frames facilitate economical construction and maintenance and equality of weight distribution to each roller. An improved tamping foot construction also promotes economy of manufacture.

The foregoing and other objects and advantages will become more apparent from the following detailed description which proceeds with reference to the accompanying drawings wherein:

FIG. 1 is a side elevational view of a compactor vehicle in accordance with the present invention;

FIG. 2 is a top plan view of the compactor vehicle on the same scale as FIG. 1 with most of the vehicle's top covering broken away to show the frame-mounted components;

FIG. 2A is a plan view on the same scale as FIG. 2 showing the driver's compartment and control console which normally occupies the outlined area 2A of FIG. 2;

FIG. 3 is a top plan view of the compactor vehicle on a reduced scale shown the vehicle in a turn and with portions broken away to illustrate the path of the rollers during the turn;

FIG. 4 is an elevational view taken along the line 4—4 of FIG. 2A but on a larger scale than FIG. 2A showing the driver's compartment and control console;

FIG. 5 is a side elevational view of the control console taken along the line 5—5 of FIG. 4;

FIG. 6 is a diagram of the transmission control for the vehicle;

FIG. 7 is a side view of an upper portion of one of the rollers of FIG. 1 on an enlarged scale illustrating the details of the roller and tamping foot; and FIG. 8 is a sectional view taken of one of the tamping feet on a larger scale than FIG. 7 and taken along the line 8—8 of FIG. 7.

DETAILED DESCRIPTION

*General arrangement*

With reference to the drawings, FIGS. 1 and 2 illustrate a compactor vehicle 10 comprising basically a pair of main frames, including a front frame 12 and a rear frame 14, joined together end to end by a hitch connection 16 which provides for turning movement of the front and rear frames relative to one another about a vertical axis 18 between the frames and for oscillation relative to one another about a longitudinal axis 20. The hitch connection includes pivot pins 22, 23 pivotally connecting together a drawbar bracket 24 rigidly connected to a rear cross beam of the front frame and a drawbar yoke 26. The drawbar yoke has a rearwardly projecting horizontal shaft 28 which is journaled in a hitch member 30 rigidly connected to a front cross beam of the rear frame to provide for oscillation between frames.

The front and rear frames are in most respects identical as will become evident from a comparison of the frames as shown in FIG. 2, thereby enabling fabrication of both frames on the same assembly line using the same jigs for each. Both frames are of open rectangular construction and include identical outer end members 32, 32a spaced from identical inner end members 34, 34a, with the outer and inner end members being joined together by horizontally opposed side leg members 36, 36a and 38, 38a. Extending inwardly from outer end members 32, 32a are identical motor mounting platforms 40, 40a, respectively.

Each frame is supported by a single compaction and traction roller 42, 42a rotatably mounted between the opposite side frame members thereof. The two rollers are also identical, and each has an axial length which spans substantially the full width of the frame opening between the opposite side members so as to provide compaction coverage throughout substantially the full width of the vehicle in a single pass over a surface under compaction. Stub shafts 44 and 46 project from the opposite ends of each roller and are journaled in bearing members 48, 49 on the opposite side members of the associated frame. Since the rollers are identical in every way, the bearing members mounting the rollers on their respective frames may also be of identical construction and are identically positioned on each frame, contributing further to the general identity of the front and rear units of the vehicle.

The two rollers are driven independently of each other by separate but substantially identical drive means 52, 52a in corresponding positions on their respective frames. The overall identity of the front and rear units of the vehicle will be more readily appreciated if the two units can be visualized as being unhitched and placed in side-by-side relationship with the outer ends 32, 32a of the units in lateral alignment.

In addition to the components of the front frame just described which are identical to corresponding components of the rear frame, the front frame has added to it a driver's compartment 54 including a control console 56 and fuel tanks 58 which supply fuel to the engines at opposite ends of the vehicle through suitable conduits (not shown) leading to the engines through passages defined by elongate central channel members 60, 60a, shown in FIGS. 1 and 3, forming part of identical sheet metal top covers 62, 62a. The covers shield the rollers from above to protect the operator from mud and other debris thrown upwardly by the rollers.

An earth-leveling blade 64 is pivotally attached by arms 66 to the front end of front frame 12, and a vertically mounted hydraulic cylinder 68 raises and lowers the blade into engagement with the surface under compaction. Cylinder 68 is connected to a source of hydraulic pressure fluid (not shown) on the front frame. Blade member 64 and its appurtenances are preferably of light-weight construction to prevent any appreciable unbalancing of the unit loading of the two rollers. To discourage bulldozing, which would damage the blade and further unbalance the loading of the rollers, the blade is provided with skids 70 which prevent the blade from digging into the earth. For the same reason, cylinder 68 is incapable of applying any substantial downward pressure on the blade.

Although not evident from FIGS. 1 or 2, the superstructure of the two frames, including engine covers 72, 72a, transmission covers 74, 74a and roller covers 62, 62a are identical. The identity is not evident from FIG. 1 because each frame and its superstructure is unsymmetrical about a vertical median plane through the frames. That is, the visible side of the frame and mentioned superstructure of the front unit in FIG. 1 is of the same configuration as the reverse and invisible side of the rear unit in the same figure, and the visible side of the rear unit in FIG. 1 is the same as the invisible side of the front unit of FIG. 1.

DRIVE MEANS

Referring to the front frame of FIG. 2, the drive means 52, 52a on each frame includes an internal combustion engine 76 mounted in an upright position on platform 40 and cooled by a radiator 78 at one side of the frame. The engine has a drive shaft 80 projecting from one of its opposite ends and mounting a radiator fan. The opposite end of the drive shaft transmits power to a torque converter 82 which in turn transmits power through a shaft 83 to a reversible transmission 84 having three speed ranges in both forward and reverse gear. Power is transmitted by a pinion gear 86 from the transmission to a bevel gear 87 within a gear box 88 at the opposite side of the frame from the radiator and engine. The bevel gear serves to change the lineal direction of power transmission, and to this end is mounted on a drive shaft 89 extending generally longitudinally of the frame. The final drive train is housed within hollow side leg member 38 and includes a shaft 90 connected by two U-joints to shaft 89 and to a shaft of a pinion gear 92 which in turn drives a bevel gear 94. Mounted on the same shaft as bevel gear 94 is a spur gear 96 which meshes with a large bull gear 98 mounted on shaft 46 of the roller to drive the same.

The engine 76a, radiator 78a, torque converter 82a, transmission 84a and gear box 88a on the rear frame are duplicates of the same components on the front frame. In fact, the entire drive means on the two frames are identical with one exception in the final drive, and that is the addition of an idler gear 100 between spur gear 96 and bull gear 98a on the rear frame. The idler gear reverses the direction of rotation of bull gear 98a so that roller 42a of the rear frame will be driven in the same direction of rotation as roller 42 of the front frame when the frames are hitched together as shown and when both transmissions are in forward or reverse gear at the same time. It is desirable that the transmissions of both engines be in forward or in reverse gear at the same time, particularly when duplicate engines are used, because many transmissions operate at a slightly different speed in forward and reverse gear, and it is of course desirable that both rollers be rotated at the same speed at the same time.

The components of the engine and drive train are not only identical, but they are also identically positioned on their respective frames. Of course, when the frames are joined end to end as shown in FIG. 2 in their normally operative positions, the corresponding parts and components of the two frames will be on opposite sides of the vehicle because of the back-to-back relationship of the frames.

Hydraulic pressure for operating the torque converter, transmission and other drive components as required is supplied to separate pumps 102, 102a mounted on their respective torque converters. The torque converter of each engine also mounts an auxiliary pump (not shown) for supplying hydraulic power for the steering and leveling blade controls.

The identity of the two frames and their components in the respects mentioned and the identical positioning of such components on their respective frames has several important advantages. One of the significant advantages is the savings in manufacturing costs resulting from the front and rear frames being fabricated as identical units in assembly line fashion on a single assembly line throughout a major portion of their manufacture and assembly, using the same jigs for each and duplicate parts and components. When the major job of manufacturing and assembly has taken place, the identical units are modified as required to make one a front unit and the other a rear unit as, for example, by adding the blade, fuel tanks and driver's compartment and front hitch to one frame and the rear hitch and idler gear to another frame.

The identity of the two units in the respects noted also provides a substantially symmetrical load distribution between the two units, resulting in substantially balanced loading of the two rollers. Since the rollers are identical, they will transmit substantially equal unit loads to the surface under compaction, resulting in both rollers having the same compactive effect and resulting in two complete compaction coverages of equal magnitude for each single pass regardless of whether the pass is made with the vehicle traveling in a forward or reverse direction. Balanced unit loading of the rollers also provides the rollers with equal tractive effect, giving the vehicle maximum traction.

Another important advantage of the specific arrangement of components on the two frames is the resulting low center of gravity which gives high stability in turns. The low center of gravity results primarily from the engine and drive train being mounted at the opposite ends of the vehicle forwardly and rearwardly of the rotational axes of the rollers and very nearly in the horizontal plane of such axes. The compactor's stability in turns is further enhanced because the weight of the engines and their drive trains is concentrated outside the axes of rotation 101, 101a of the two rollers. Thus the centers of gravity 103, 103a (FIG. 3) of the frames lie outside the axes of rotation 101, 101a so that in a turn, the centers of gravity of both units will be on the inside of the curve, as determined by the imaginary line 105 of FIG. 3 joining the midpoints of the roller axes, to counteract the centrifugal force tending to overturn the vehicle. In fact, it has been found that in operation the compactor vehicle can be driven at high speed in tight turns with complete confidence, as the compactor will slide sideways in a turn before overturning.

DRIVER COMPARTMENT

The driver compartment of the vehicle is designed for maximum driver comfort, visibility and control while the vehicle is traveling in either a forward or reverse direction.

As shown best in FIGS. 1 and 2A, the driver's compartment is mounted at the rear of the front frame but overhangs the hitch connection between frames. A pair of laterally opposed driver's seats 104, 104a are mounted at opposite sides of the compartment and face inwardly toward one another. This arrangement permits the operator to sit in the seat which provides maximum visibility under the circumstances and enables the operator to see on both sides of the vehicle with equal facility when operating in either forward or reverse.

Referring to FIGS. 2A, 4 and 5, control console 56 at the front end of the compartment includes dual steering wheels 108, 108a each mounted within convenient reach of one of the two seats. A pair of arcuate stabilizing bars, 110, 110a are rigidly mounted on the control console, one just rearwardly of each steering wheel in a position so that the operator can rest a hand on the bar while at the same time gripping the adjacent steering wheel with the same hand. This enables the operator to maintain the compactor on a predetermined course while being jarred and jolted by rough terrain that would ordinarily cause the operator to jerk the steering wheel and thereby alter his course.

The control console also includes dual sets 112, 112a of indicator dials and switches on the opposite sides of the control console, one set for each engine. Other dual controls are also provided, including dual blade control levers 114, 114a (FIG. 2A), dual transmission range shift levers 116, 116a, and dual combined forward-reverse shift and speed control levers 118, 118a. Each forward-reverse shift lever 118, 118a moves in an inverted U-shaped guideway 120, 120a. By shifting either lever 118, 118a along the horizontal upper portion of its associated slot from left to right, the transmission is shifted from forward to reverse. By sliding the lever down one or the other of the two vertical legs of the slot, the speed of the engine is increased within the selected speed range as determined by lever 116 or 116a.

It will be noted from FIG. 2A that the dual steering wheels and other dual controls are located toward the center of the vehicle from the seats in positions to enable the operator to control the vehicle from either seat or, if desired, while standing in the center of the vehicle. A single large foot brake pedal 121 is centered near the floor of the compartment within easy reach of an operator in either seat.

Manipulation of any one of the dual engine and transmission control levers just described automatically affects both engines in a manner to synchronize their operation so that both rollers are driven in the same direction and at the same speed at any given time. For example, horizontal movement of either dual forward-reverse shift lever shifts both transmissions into forward or reverse, as selected, at the same time and downward movement of the same lever changes the speed of both engines simultaneously and to the same extent.

DRIVE CONTROLS

FIG. 6 shows, in diagrammatic form, common transmission range control means 122 for shifting both transmissions synchronously into one of four speed ranges including neutral and common transmission directional control means 124 for shifting both transmissions into forward or reverse at the same time. Both controls are shown approximately as they are positioned on the compactor. Each of the controls is operated by dual operating levers, as previously described, so as to be available from either side of the driver's compartment.

Range control levers 116 and 116a are pivoted at 126 and 126a and interlocked with rods 128 and 128a, which in turn are connected to opposite ends of a cam shaft 130 which operates an electric multiposition command selector switch 132. A series of electrical conductors shown in the diagram as a single line 134 lead from selector switch 132 to a junction point 136 where the conductors divide and lead as branch conductors 138 and 138a to a pair of electrohydraulically actuated units 140, 140a, one adjacent transmission 84 on the front frame and the other adjacent transmission 84a on the rear frame. No further mention need be made of the control details at the rear end of the vehicle because they are identical to the control details at the front end, as now described.

Electrohydraulic actuator 140 includes electrically actuated hydraulic valves 142 which control the admission of pressure fluid into the opposite ends of a two-way hydraulic power cylinder 144. Cylinder 144 has a piston rod 146 which is connected to an actuating lever 148 on transmission 84 for shifting the same. Pump 102 driven by engine 76 pumps fluid under pressure through a conduit 150 to hydraulic valves 142. Electrical energy from a battery 152 opens the selected one of hydraulic valves 142, as determined by command selector switch 132 so that hydraulic pressure will move piston rod 146 in a direction to shift the transmission into the desired range. When the piston rod moves through a distance sufficient to shift the transmission into the selected range, the electrical circuit to the open one of hydraulic valves 142 is automatically interrupted to reclose such valve and thereby stop further movement of the piston rod. The exact details of the command selector switch unit 132 and the electrohydraulic actuator unit 140 which provide for the automatic interruption of the circuit at the proper time are well known in the art and form no part of the present invention, and therefore are not described further.

However, one important detail of the control sysetm which ensures the synchronous shifting of both transmissions into corresponding speed ranges is the provision of diodes 154, 156 in the electrical conductors 138 and 138a between command selector switch 132 and the electrohydraulic actuators 140 and 140a. The diodes are positioned to permit electrical current to flow from the command selector switch to the pair of actuators but to prevent the feedback of current through conductors 138 and 138a from one actuator to the other, thereby preventing malfunctions, and specifically, nonsynchronous operation of the two actuator units.

As suggested above, when either range control lever 116 or 116a is shifted, for example from neutral to third gear, command selector switch 132 paces off three steps. This causes electrohydraulic actuators 140 and 140a at the opposite ends of the vehicle to pace off the same three steps in the same direction simultaneously, to complete an electrical circuit opening the proper one of hydraulic valves 142 to move the piston rod of the hydraulic cylinder in the required direction. At the same time, actuators 140 and 140a are conditioned to break the electrical circuit to the open hydraulic valve when the piston rod has moved the required distance to shift the transmission to the selected drive range. Once the transmission has been shifted into its preselected range, it is held there by a detent (not shown), which is well known in the art, until one of the control levers is again shifted.

Because both actuator units 140, 140a are connected to a common command selector switch 132 by identical circuits, each containing diodes to prevent feedback from one actuator unit to the other, the two actuator units will always be in phase with each other. This requirement is necessary in a control system of the kind described because serious consequences, which are believed to be obvious, would rseult if one roller were driven at a different speed than the other roller.

The directional control system 124 operates in the same manner as the range control just described to shift the two transmissions synchronously from forward to reverse or vice versa, except that only a two-position selector switch 160 is required, one for forward and the other for reverse gear. The directional control system includes all of the essential components of the range shift system including the dual operating levers 118 and 118a, each capable of operating a selector switch cam 162 to direct electrical current from source 152 through a selected one of a series of conductors 164 and 164a to a pair of electrohydraulic actuator units 166 and 166a at the two transmissions. Hydraulic fluid under pressure is supplied to the hydraulic valves of the actuator units 166 and 166a by the same pumps 102, 102a that supply hydraulic fluid to the actuator units 140 and 140a. Diodes 168 and 170 may be provided in the electrical conductors 164 and 164a to prevent feedback of current from one of the actuator units 166 and 166a to the other for the same reasons as mentioned with respect to the range shift control system. Because the two systems operate in the same manner as already described with respect to the range shift control unit, further description of the directional control unit is unnecessary.

It will be apparent from the foregoing that the described electrohydraulic type of control is ideally adapted to the present compactor because of the necessity, among other things, to conduct all control commands from a single operating station at the middle of the vehicle to remote stations at the opposite ends of the vehicle adjacent the drive means while maintaining at the same time complete mechanical flexibility between the two frames through the illustrated hitch assembly. Electrical conductors are ideally suited for this purpose. In addition to the above requirements, considerable force must be available at the transmissions because the gears to be shifted are extremely heavy and therefore hard to shift. Thus, hydraulic "muscle" is provided as described.

A synchronous speed, or governor, control is also provided for the two engines but such control is not illustrated because it is a conventional hydraulically actuated control which is well known in the art. Briefly, such control includes a pair of master hydraulic cylinders (not shown) adjacent the driver's compartment operated together by either one of the dual forward-reverse and throttle control levers 118, 118a. The pair of master cylinders control a pair of slave cylinders, one at each engine, which in turn act on governor shafts at the engine to control the engine speed. The mechanical linkage between the dual throttle levers is adjusted so that movement of either one of the control levers displaces an equal volume of fluid from each master cylinder so that both slave cylinders extend equal amounts to rotate their respective governor shafts through equal distances so that the speeds of the two engines will be synchronized throughout the full speed range.

Braking of the vehicle is accomplished by applying a braking force to the transmission shafts at the opposite ends of the vehicle in a well-known manner such as, for example, by a shoe and drum-type brake similar to the types used in heavy-duty truck installations.

Both the electrical and the hydraulic lines required for the various controls such as transmission, governor and brakes are routed from the region of the driver's compartment through the center channels 60 and 60a of front and rear roller covers 62, 62a toward the front and rear ends of the vehicle.

The vehicle is steered by a center point steering system which acts to pivot the front and rear frames relative to one another about the axis of the hitch pins 22, 23. As shown in FIG. 2, the steering system includes a single two-way hydraulic fluid-actuated cylinder 172 carried by inner end member 34 of the front frame and having a piston rod 174 pivoted at 176 to the forward end of a steering arm 178 which extends between the two frames and is rigidly connected at its opposite end to drawbar yoke 26. The pump (not shown) which supplies hydraulic pressure fluid to the steering cylinder is an auxiliary pump separate from those supplying fluid to the transmission controls and driven by one of the two engines. Extension of piston rod 174 tends to pivot the rear frame in a clockwise direction about the axis of the pins and turning movement of the front frame in a counterclockwise direction relative to the rear frame about the same axis.

Such center point steering has the advantage in a twin-framed compactor vehicle as described of providing highly responsive steering and of enabling sharp turns with perfect tracking of the rollers so that full double coverage compaction occurs in turns as well as on straightaways, as illustrated FIG. 3.

Another advantage of center point steering is that it provides the same steering characteristics in forward and reverse. That is, the operator always turns the steering wheel in the direction of the turn, no matter in which direction the vehicle is traveling, unlike normal tractor-trailer steering, which is always difficult in reverse.

ROLLER DETAILS

Referring to FIGS. 1, 2 and 7, the two rollers are identical in every respect. Each roller is composed of a hollow cylindrical drum 180 closed at its opposite ends by end plates 182 to which the stub shafts 44, 46 are rigidly affixed. The drums are preferably watertight and provided with an opening (not shown) to permit them to be filled with water, if desired. The surface of each drum throughout its entire axial length is provided with laterally spaced and circumferentially extending rows of tamping feet 184. The feet are of a unique construction, as shown in FIGS. 7 and 8, which enables them to be applied easily to the drum. That is, the main body of each foot in a row, including flanks 186 and outer end 187, is one corrugation of a one-piece corrugated sheet strip 188 which at least partially encircles the drum and is welded to its surface to form at least several feet of a row of feet. The open opposite sides of each corrugation are closed by side plates 190, 191, which fit inside the side edges of the corrugation to reinforce the same. A wear-resistant steel cap 192 is welded to the top of each corrugation to complete the tamping foot.

The described foot construction is advantageous in that it is not only simplified and economical, but it also has the effect of reinforcing the drums so that the drums can be made of a thinner gauge material than would otherwise be possible.

Although the two rollers are of identical construction, it will be noted from FIG. 2 that when they are mounted on their respective frames and the frames hitched together end to end, the rollers will be in reversed positions with respect to one another. Furthermore, the frames themselves are reversed with respect to each other when hitched together and nonsymmetrical about the longitudinal center line of the vehicle, as will be apparent from FIG. 2. In fact, the nonsymmetry is such that the rows of tamping feet on the front roller 42 will be staggered with respect to the rows of tamping feet on rear roller 42a so that the rows on one roller will be centered in alignment with the gaps between the rows on the other roller.

Yet the tamping feet are wider than the gaps between such feet so that there is at least some overlapping of coverage with respect to the front and rear tamping feet when the vehicle passes over a given area, and the entire surface area beneath the rollers will thus be compacted in a single pass without any omissions. With center point steering, as previously described, providing perfect tracking of the front and rear rollers in turns, full width coverage is obtained even in turns, as will be apparent from FIG. 3. This full width coverage feature is most important for achieving high-production compaction.

Referring again to FIG. 1, each roller is provided with two sets of cleaning blades 194, 196 for removing mud, dirt and other matter from the gaps between adjacent rows of tamping feet. The set of blades 194 function when the vehicle travels in a reverse direction while the blades 196 function when the vehicle travels in a forward direction. There is one blade of a set for each gap between feet, and each blade comprises a thin, relatively flexible bar of steel or other suitable material rigidly affixed to the frame of the roller and directed at an inclination toward the surface of the roller drum in a direction opposed to the direction of rotation of the drum during the time that the blade will function. The outer end of the blade terminates just short of the drum surface so that upon rotation of the drum in one of its two directions, the blade will remove dirt and other matter from the drum between teeth with a peeling action. Each blade has backing members 197, 198 which stiffen the blade somewhat.

Having illustrated and described a preferred embodiment of our invention, it should be obvious to those skilled in the art that the same permits of modification in arrangement and detail. We claim as our invention all such modifications as come within the true spirit and scope of the following claims.

We claim:
1. A self-propelled compactor vehicle comprising:
a pair of longitudinally related main frames joined together for articulation about an upright axis between said frames,
a pair of rollers rotatably mounted one on each of said frames on opposite sides of said axis,
a separate internal combustion engine and drive means for each of said rollers, with each said internal combustion engine and associated drive means being mounted on the frame of the roller which it drives,
said engines and rollers for said frames being symmetrically arranged longitudinally with respect to said axis so that said rollers transmit substantially equal static unit loads to the surface under compaction.

2. Apparatus according to claim 1 wherein said pair of rollers are of substantially the same axial length, extend continuously from side to side of their respective frames and are mounted in approximate longitudinal alignment on their respective frames so that one pass of said vehicle over a surface under compaction effects two coverages of said surface with each coverage approximating the full width of said frames.

3. Apparatus according to claim 1 including means providing relative oscillation of said frames about a longitudinal axis.

4. Apparatus according to claim 1 including common remote control means for controlling and synchronizing the operation of both said internal combustion engines so that both said rollers are rotated at the same speed and in the same direction at the same time.

5. Apparatus according to claim 1 including hydraulic steering means for pivoting said frames relative to one another about said upright axis.

6. Apparatus according to claim 1 wherein said frames are of substantially the same size, weight and configuration, and are connected together back-to-back,
said internal combustion engines and drive means are substantial duplicates of one another and mounted in corresponding positions on their respective frames,
said rollers are of substantially the same size, weight and configuration and are mounted in corresponding positions on their respective frames.

7. Apparatus according to claim 6 wherein each said pair of internal combustion engines and drive means include identical internal combustion engines, identical reversible transmissions, and drive trains connecting said transmissions to their respective rollers,
one of said drive trains including a direction reversing gear means so that both said transmissions can be placed in forward or reverse gear at the same time to rotate said pair of rollers in the same direction.

8. Apparatus according to claim 1 wherein each said roller comprises a single cylindrical drum extending continuously throughout substantially the full width of its associated frame.

9. Apparatus according to claim 6 wherein a driver's compartment including a control console is mounted on one of said frames above the articulated connection between said frames.

10. Apparatus according to claim 8 wherein each said drum is provided with a plurality of circumferentially extending rows of tamping feet, said rows being laterally spaced apart and extending throughout substantially the entire axial length of said drum, the rows on one of said drums being laterally offset from, but overlappingly related to the rows of the other said drums so that the entire width of surface over which said rollers pass is tamped in a single pass.

11. Apparatus according to claim 1 including a driver's compartment on one of said frames midway between said rollers, said driver's compartment including a pair of laterally opposed operator's seats, said seats being mounted adjacent the opposite sides of said one frame and facing inwardly toward one another,
and dual sets of steering, speed and directional controls, one set being conveniently positioned adjacent each of said seats.

12. Apparatus according to claim 11 wherein each of said steering controls includes a pivotally mounted steering wheel and a rigidly mounted hand support member immediately adjacent said wheel in a position for enabling an operator to grip the wheel with one hand and stabilize the same hand on said member at the same time whereby the unpredictable movements of said vehicle caused by rough terrain will not affect the steering of said vehicle.

13. A self-propelled compactor vehicle comprising:
a pair of longitudinally related and separated main frames,
hitch means interconnecting said frames for oscillation relative to one another about their respective longitudinal axes and for turning movement relative to one another about an upright axis,
a pair of cylindrical compaction and traction rollers, one rotatably mounted on and supporting each of said frames, said rollers being positioned longitudinally on opposite sides of said hitch axis,
a pair of internal combustion engines and associated transmissions, one mounted on each said frame for driving the roller on the same said frame,
common remote control means for both said engines, including means for synchronizing the speed and direction of rotation of said pair of rollers,
and steering means for pivoting said frames relative to one another about said upright axis,
each one of said rollers extending continuously throughout the major portion of the width of the frame it supports,
said pair of frames being of substantially the same overall width,
said internal combustion engine and transmission on each frame being positioned longitudinally outwardly of the roller for the same said frame relative to said upright axis and being arranged on said frame so that the weights of said engines, transmissions and rollers combine to counteract the centrifugal force-induced overturning moment of said vehicle during a turn.

14. Apparatus according to claim 13 wherein said drive means transmit equal power and speed to said rollers at any given time whereby the dynamic loading of both said rollers will be substantially the same.

15. A self-propelled compactor vehicle comprising:
a pair of main frames, each having opposite ends and opposite sides,
hitch means joining together said frames at one set of ends for turning movement about a vertical axis and for oscillation about a longitudinal axis,
a pair of generally cylindrical rollers, one rotatably mounted on each frame for supporting the same,
drive means including an internal combustion engine, a reversible transmission and a drive train on each frame for driving the roller on the same frame,
said engines, transmissions and drive trains on said frames being positioned longitudinally outwardly of their respective rollers and substantially equal respective distances longitudinally on opposite sides of said hitch axis.
common control means for controlling and synchronizing the speed and direction of both said drive means,
and steering means for pivoting said frames relative to one another about said upright axis.

16. Apparatus according to claim 15 wherein:
said speed and directional control means include remote control means for synchronously shifting both transmissions,
said remote control means including manual control means intermediate the opposite ends of said vehicle,
electrical selector switch means remote from said transmissions and actuated by said manual control means,
a pair of hydraulic actuator means, one adjacent each of said transmissions for shifting said transmissions,
a pair of electrically actuated hydraulic valve means, one for controlling the operation of each said hydraulic actuator means,
electrical conductor means extending from a source of electrical power through said switch means to both said hydraulic valve means,
and diode means in said electrical conductor means between said switch means and said hydraulic valve means permitting the flow of electrical current from said switch means to both said hydraulic means but preventing the feedback of electrical current from either one of said valve means to the other of said valve means.

17. A self-propelled compactor vehicle comprising:
a pair of longitudinally related main frames joined together for articulation about an upright axis between said frames,
a pair of rollers rotatably mounted one on each of said frames,
a separate drive means for each of said rollers, each said drive means being mounted on the frame of the roller which it drives,
said rollers transmitting substantially equal static unit loads to the surface under compaction,
at least one of said rollers including a plurality of laterally spaced apart rows of tamping feet extending circumferentially about the surface of said roller, each row being formed of at least one strip of corrugated sheet material, with each strip including plural corrugations each defining a predetermined profile of one tamping foot in the row, each corrugation being closed at its opposite open side edges by side plates, each corrugation being capped at its projecting outer end surface by a plate of wear resistant material, each said strip being fixed to the peripheral surface of said roller.

18. A self-propelled compactor vehicle comprising:
a pair of main frames each having opposite ends and opposite sides,
hitch means joining together said frames at one set of ends for turning movement about a vertical axis and for oscillation about a longitudinal axis,
a pair of generally cylindrical rollers, one rotatably mounted on each frame for supporting said frame,
drive means including an engine, a reversible transmission and a drive train on each frame for driving the roller on the same frame,
said engine, transmission and drive train on each frame being positioned longitudinally outwardly of the roller on the same frame,
common control means for controlling and synchronizing the speed and direction of both said drive means,
and steering means for pivoting said frames relative to one another about said upright axis,
said speed and directional control means including remote control means for synchronously shifting both transmissions,
said remote control means including manual control means intermediate the opposite ends of said vehicle,
electrical selector switch means remote from said transmissions and actuated by said manual control means,
a pair of hydraulic actuator means, one adjacent each of said transmissions for shifting said transmissions,
a pair of electrically actuated hydraulic valve means, one for controlling the operation of each said hydraulic actuator means,
and electrical conductor means extending from a source of electrical power through said switch means to both said hydraulic valve means.

19. Apparatus according to claim 18 wherein there are two of said remote control means, one for shifting said transmissions simultaneously from forward to reverse and vice versa and the other for shifting both said transmissions simultaneously to different speed ranges while said transmissions are in either forward or reverse.

20. Apparatus according to claim 18 wherein said manual control means includes dual manual control selector members for operating said selector switch means.

21. Apparatus according to claim 19 wherein each said remote control means includes a dual selector member for operating said selector switch means of the same said remote control means.

22. A self-propelled compactor vehicle comprising:
a pair of longitudinally related main frames each having opposite sides and inner and outer ends,
hitch means joining together said frames at their inner ends for relative turning movement about an upright axis and relative oscillation about a longitudinal axis but otherwise rigidly interconnecting said frames,
steering means for pivoting said frames relative to one another about said upright axis,
a pair of compaction and traction rollers, one rotatably mounted on each said frame for supporting the same said frame, said rollers being spaced longitudinally on opposite sides of said hitch axis,
a pair of internal combustion engines and associated drive means, one on each frame for driving the roller on the same said frame,
the center of gravity of the engine and drive means on each frame being positioned toward the outer end of said frame from the axis of rotation of the roller on the same said frame,
the center of gravity of each frame being positioned outwardly of the axis of said roller on the same said frame,
said pair of rollers supporting the entire weight and loading of said frames on the surface under compaction,
said pair of rollers transmitting substantially equal static loads to the surface under compaction.

23. A self-propelled compactor vehicle comprising:
a pair of substantially identical main frames, each having opposite sides, an outer end and an inner end,
the inner ends of said frames being arranged in facing juxtaposition with one another,
hitch means connecting together said frames at said inner ends for relative turning movement about an upright axis and for relative oscillation about a longitudinal axis,
a pair of identical cylindrical rollers rotatably mounted in corresponding positions, one on each of said frames on opposite sides of a transverse median plane of said vehicle,
a separate drive means on each frame including an internal combustion engine, a reversible transmission and a drive train for driving the roller on the same said frame,
the engine and transmission on each frame being identical to the engine and transmission on the other frame, said engines and transmissions occupying corresponding positions on their respective frames adjacent the outer ends thereof and outwardly of said rollers,
and a driver's compartment including a control console mounted on one of said frames between said rollers and in the vicinity of said median plane,
the substantial identity of said frames and said rollers enabling the fabrication of such elements as identical units throughout a major portion of the manufacture of each, and the substantial identity of said drive means enabling the use of duplicate engines and transmissions on said frames.

24. Apparatus according to claim 23 wherein said drive trains on said frames are substantially identical to one another and occupy corresponding positions on their respective frames with the exception that one said drive train includes an idler gear for reversing the direction of rotation of said drive train whereby both said transmissions can be placed in forward or alternatively in reverse at the same time to rotate both rollers in the same direction at the same time.

25. A self-propelled compactor vehicle comprising:
a pair of substantially identical units save for certain structure to be described,
each unit including a main frame,
said main frames being of horizontal open rectangular form each made up of spaced end members connected by spaced side leg members wherein one end member of each frame defines the hitch end of the associated frame and the other end member defines the motor mounting end of the associated frame,
a pair of identical rollers, one for each frame, rotatably mounted in identical positions between the side members of their respective frames,
a pair of identical internal combustion engines, one for each of said frames,
said engines being in normal upright position in installation and having opposed ends and a driven output shaft projecting from one end thereof,
said engines being mounted in identical fashion on the motor mounting ends respectively of said frames with the engines extending transversely of the length of said compactor vehicle but parallel to the associated end members,
drive means mounted in identical fashion on said frame and connecting the output shafts of said motors respectively to their associated rollers and being mounted on certain only of said side leg members,
said frames being hitched together in end-to-end relationship at their hitch ends so that disposition of the engine and drive means of one frame is of the opposite hand from that of the other frame,
whereby said units can be fabricated as identical units in production line fashion and thereafter additions made for driver location, controls and the like without altering the fundamental identity of the major components thereof.

26. Apparatus according to claim 25 wherein said units are unsymmetrical about the longitudinal centerline of said vehicle and arranged in opposite positions of symmetry with respect to one another.

27. Apparatus according to claim 25 wherein each frame has a hollow side leg member mounting said drive means.

28. Apparatus according to claim 25 wherein said rollers are unsymmetrical about a vertical midplane of said vehicle normal to their axes of rotation and wherein said rollers are identical but of opposite-hand disposition when mounted in their respective frames and when said frames are hitched together at their hitch ends.

29. Apparatus according to claim 25 wherein said drive means are identical except that one of said drive means includes an idler reversing gear so that both said drive means can be placed in forward or alternatively in reverse at the same time to rotate both rollers in the same direction.

References Cited

UNITED STATES PATENTS

| 2,132,107 | 10/1938 | Hamm | 94—50 |
| 2,226,182 | 12/1940 | Ross | 94—50 |
| 2,347,882 | 5/1944 | Choate | 180—51 X |
| 2,484,285 | 10/1949 | Greiner | 94—50 |
| 2,954,088 | 9/1960 | Williamson | 94—50 X |
| 3,049,063 | 8/1962 | Tinnin | 94—50 |
| 3,085,484 | 4/1963 | McAdams | 94—50 |
| 3,183,804 | 5/1965 | Le Tourneau | 94—50 |
| 3,259,036 | 7/1966 | Peterson | 94—50 |
| 3,326,312 | 6/1967 | Buller | 94—50 X |

FOREIGN PATENTS 840,263 7/1960 Great Britain.

NILE C. BYERS, JR., *Primary Examiner.*